Sept. 30, 1969 L. G. AMOS ET AL 3,469,752

TAPE TRANSPORT INDEXING DEVICE

Filed Sept. 15, 1967

INVENTORS
LYNN G. AMOS
LAWRENCE W. LANGLEY

BY Sughrue, Rothwell, Mion, Zinn & Macpeak

ATTORNEYS

United States Patent Office 3,469,752

Patented Sept. 30, 1969

3,469,752

TAPE TRANSPORT INDEXING DEVICE

Lynn G. Amos, Cary, N.C., and Lawrence W. Langley, Corning, N.Y., assignors to Corning Glass Works, Corning, N.Y., a corporation of New York Filed Sept. 15, 1967, Ser. No. 668,068
Int. Cl. G03b *1/28;* B65h *17/32, 17/42*
U.S. Cl. 226—56 4 Claims

ABSTRACT OF THE DISCLOSURE

A tape transport device for feeding a perforated tape along its length in predetermined increments by alternate application of fluid jets to opposite side of said tape.

BACKGROUND OF THE INVENTION

Computers and other related apparatus frequently used punched tapes, magnetic tapes or other forms of recording tapes as carriers of information. In utilizing these information carrying tapes it is usually required to provide a suitable feeding mechanism for feeding the information carrying tape to the apparatus so that information may be placed on or taken from the tape. Frequently it is required to move the tape through the apparatus in a step by step manner. Up to now mechanical or electromechanical stepping devices have been used. The use of a pneumatic or fluid drive for the stepping device is also known but the equipment is usually of a mechanical nature comprising a sprocket wheel, ratchet wheel and pawl.

The present invention is directed to a fluid operated stepping device for feeding the tape to the apparatus in a step by step operation involving no mechanical moving parts whatsoever. The device of the present invention is capable of stepping a tape to a distance of one character spacing in a forward or backward direction each time a fluidic signal is received. The device is also suitable for feeding other flexible elements such as movie film or the like.

For the control of operation of the fluid operated stepping device of the present invention fluid logic elements may be utilized. In the case where the logic part of the computer in which the fluid operated tape stepping unit is utilized is constructed with the use of fluid logic elements, it is quite natural that these same fluid logic elements should also be used for the control of the drive of the recording tape.

SUMMARY OF THE INVENTION

The present invention is directed to a tape transport indexing device comprising first plate means having a flat surface thereon, second plate means having a concave depression in one surface intermediate the ends thereof, said one surface of said second plate means and said flat surface of said first plate means being disposed in opposing spaced apart relation to define a path therebetween for the passage of a tape having a plurality of equally spaced holes disposed along the length thereof, first pin means formed on said first plate means extending toward but spaced from said second plate means on one side of said depression, second pin means formed on said second plate means extending toward but spaced from said first plate means on the opposite side of said depression and opposing fluid ports formed in said first and second plate means adjacent each of said pin means and said depression respectively; said pin means, said ports and said depressions being disposed substantially in line along the path of travel of a tape passing between said plate means.

Other features of the invention will be pointed out in the following description and claims and illustrated in the accompanying drawings, which disclose, by way of example, the principles of the invention and the best mode which has been contemplated of applying those principles.

Figure 1:
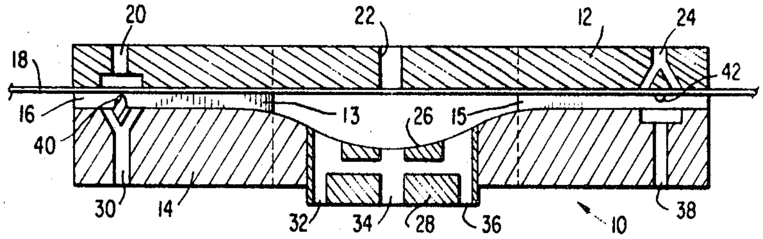
FIG. 1 is a side elevational view in section showing the tape positioned in response to fluid jets issuing from all of the ports in the lower plate.

Turning now to a detailed description of the stepping device which is generally indicated by the numeral 10 in FIG. 1, the device is comprised of an upper plate 12 and a lower plate 14 which are disposed in adjacent but spaced apart positions relative to each other. The two plates 12 and 14 may be held in their relative spaced apart positions by any suitable means such as side plates 13 and 15 or the entire device 10 may be constructed from a solid block of material such as photoform glass having suitable passageways and vents formed therein. A longitudinal passageway 16 is formed in the space between the two plates 12 and 14 to accommodate the passage of a tape member 18 therethrough.

The face of the upper plate 12 defining the upper wall of the passageway 16 is completely smooth and flat. A plurality of air ports 20, 22 and 24 are disposed through the upper plate 12 and communicate with the interior of the passageway 16. The air ports 20 and 24 are disposed substantially adjacent each end of the passageway 16 and the air port 22 is disposed centrally of the passageway.

The air ports 20, 22 and 24 may be selectively connected to any suitable source of fluid under pressure. Also disposed through the upper plate 12 are a pair of vents 21 and 23 (FIG. 5) to allow the escape of fluid from between the tape 18 and the upper plate 12 when the tape is moved from the position shown in FIG. 3 to the position shown in FIG. 4.

Additional vents are provided along the sides of the passageway 16 through the space shown in FIG. 1 between the plates 13 and 15. The vents are necessary to allow the tape to perform in the desired manner and help the dynamic operation by allowing the escape of fluid from between the tape and the cavity wall.

The lower plate 14 is provided with an upper surface forming the lower wall of the passageway 16 which is substantially flat adjacent the ends of the passageway 16 but which is formed with a concave depression 26 along the central portion of the passageway. The concave depression 26 is joined to the flat end portions of the upper surface of the plate 14 by means of a smooth line of curvature so that no sharp edges will be formed which would adversely affect the tape 18. The plate 14 may be of one piece construction or the plate 14 in the area of the concave depression 26 may be formed as a separate block or plug member 28 which may be adjustable relative to the main portion of the plate 14 toward and away from the upper plate 12 to vary the size of the chamber defined by the concave depression 26 and the flat surface of the upper plate 12. The adjustable block or plug 28 is shown in FIG. 1 in the closest position that the block will occupy relative to the upper plate 12. In other words, the concave surface 26 of the block 28 will never protrude above the upper surface of the main portion of the plate 14. To enlarge the chamber at the central portion of the passageway 16 the block 28 may be moved away from the plate 12 and held in the adjusted position by any suitable means. For example, the block 28 could be formed as a cylindrical plug and be screw fitted into the lower plate 14 so that everytime the block 28 is rotated 180°, the block will be in a new position of adjustment. On the other hand the block 28 could be slidably mounted within an aperture in the plate 14 and latched in a plurality of positions by means of a suitable latch mechanism. The block means is formed with a plurality of fluid ports 32, 34 and 36 which may be connected to a suitable source of fluid under pressure. The centermost port 34 in the block 28 is disposed substantially opposite the port 22 formed in the upper plate 12. Additional ports 30 and 38 are disposed adjacent the ends of the passageway 16 in the lower plate 14 in substantial opposed relation to the ports 20 and 24 respectively in the upper plate 12 and are also selectively connectible to fluid under pressure.

Figures 4, 5, 6:
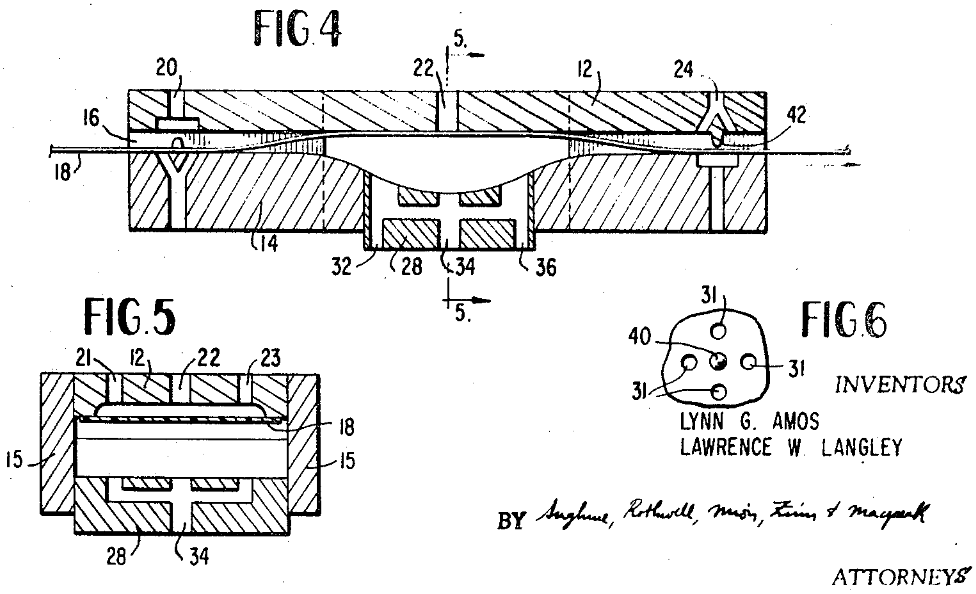
FIG. 4 is a view similar to FIG. 3 showing the tape position with fluid jets issuing from the end ports of the upper plate and the central ports of the lower plate.
FIG. 5 is a sectional view taken along the line 5—5 of FIG. 4.
FIG. 6 is a perspective plan view of one of the pins and the arrangement of fluid ports surrounding that pin.

The lower plate 14 is provided with a pin 40 adjacent the port 30. The pin 40 extends toward the upper plate 12 but is spaced therefrom by a distance slightly greater than the thickness of the tape 18 which is to be passed along the passageway 16. The upper plate 12 is provided with a pin 42 similar to the pin 40 adjacent the plug 24. Pin 42 extends downwardly toward the lower plate 14 but is spaced therefrom by a distance slightly greater than the thickness of the tape 18 to allow the passage of the tape 18 between the pin 42 and the lower plate 14. The ports 30 and 24 may communicate with the passageway 16 via a plurality of branch ports which substantially surround the pin members 40 and 42 respectively. A plan view of the pin 40 is shown in FIG. 6 with the branch passageways 31 of the port 30 disposed about the pin.

Figure 2:
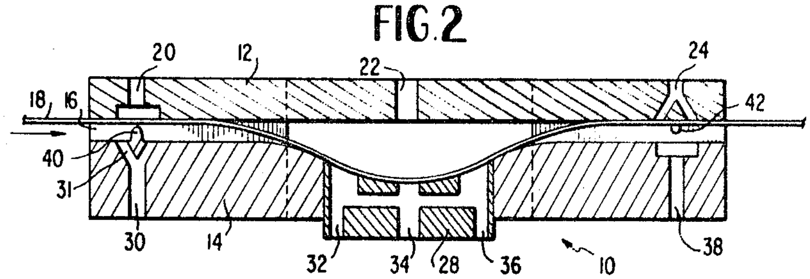
FIG. 2 is a view similar to FIG. 1 showing the tape position with fluid jets issuing from the end ports of the lower plate and from the central port of the upper plate.
Figure 3:
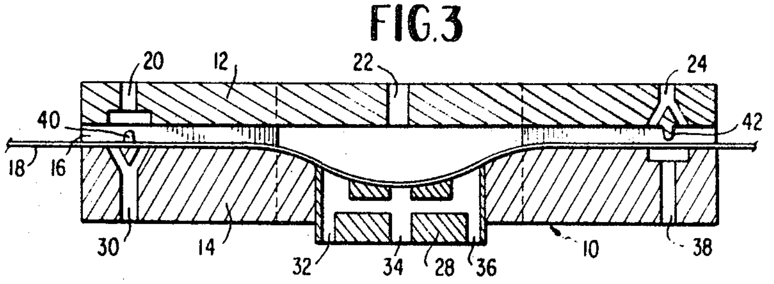
FIG. 3 is a view similar to FIG. 2 showing the tape position with fluid jets issuing from all the ports in the upper plate.

The tape 18 which is being stepped through the stepping device 10 is formed with a plurality of equally spaced perforations which are disposed along the length thereof. The perforations are of size adapted to fit over the pins 40 and 42. Assuming the fluid to be air the stepping action of the tape is achieved by blowing the tape alternately between the upper and lower plates while holding the tape on the appropriate pin with air pressure. FIGS. 1 through 4, inclusive, show the tape action in advancing one character spacing. FIG. 1 shows the tape in its initial position against the flat lower surface of the upper plate 12. Air is flowing through the ports 30, 32, 34, 36 and 38 to hold the tape against the top plate of pin 40 and on pin 42. The flow through ports 32, 34 and 36 is switched to port 22 as shown in FIG. 2. The tape is forced down against the contour of the lower plate 14. Since the tape 18 remains on the pin 42 and the length of the concave depression 26 is designed to be one character spacing longer than the straight line distance between the pins 40 and 42, the tape advances one character spacing past pin 40. FIG. 3 shows the flow of air switched to ports 20 and 24 from ports 30 and 38. This switching causes the tape to hook over pin 40 and come off pin 42. The air flow through port 22 is now switched to ports 32, 34 and 36 causing the tape to flatten out against the flat surface of the top plate 12 and thereby push the tape one character spacing past feed pin 42 as viewed in FIG. 4. If the flow through ports 20 and 24 is now switched back to ports 30 and 38, the tape will become hooked on pin 42 and blown off pin 40 thereby returning the tape to the initial condition shown in FIG. 1 except that the tape has been advanced one character spacing.

If the spacing between the perforations on another tape is greater than the spacing between the perforations on the tape 18, the block 28 may be adjusted to a position further away from the upper plate 12 thereby increasing the length of the contour of the depression between the two pins so that the distance will be one character spacing longer than the straight distance between the feed pins 40 and 42.

The use of feed pins and perforated tape substantially reduces the wear on the tape such as occurred in prior art devices utilizing a positive clamping type action on the tape during the step by step feeding action. The configuration of the air ports about the feed pin, as shown in FIG. 6 of the present invention, also aids in reducing the wear on the tape inasmuch as the tape is pushed directly off the pin. If the air port were disposed on one side of the pin only, the opposite side of the pin would tend to rub against the perforation, tending to increase the size of the perforation and thereby reduce the life of the tape.

Obviously, many modifications and variations of the present invention are possible in the light of the above teachings. It is, therefore, to be understood that the invention may be practiced otherwise than as specifically prescribed.

What is claimed is:

1. A tape transport indexing device comprising first plate means having a flat surface thereon, second plate means having a concave depression in one surface thereof intermediate the ends thereof, said one surface of said second plate means and said flat surface of said first plate means being disposed in opposing spaced apart relation to define a path therebetween for the passage of a tape having a plurality of equally spaced holes disposed along the length thereof, first pin means formed on said first plate means extending toward but spaced from said second plate means on one side of said depression, second pin means formed on said second plate means extending toward but spaced from said first plate means on the opposite side of said depression and opposing fluid ports formed in said first and second plate means adjacent each of said pin means and said depression and being disposed substantially in line along the path of travel of a tape passing between said plate means.

2. A tape transport indexing device as set forth in claim 1 wherein the fluid ports adjacent said pins in the pin carrying plate are disposed in concentric relation about each pin.

3. A tape transport indexing device as set forth in claim 1 wherein the central portion of the second plate means having the concave depression therein is adjustably mounted relative to the remainder of said second plate means for movement toward and away from said first plate means.

4. A tape transport indexing device as set forth in claim 1 further comprising vent means disposed adjacent said depression and connecting said depression to atmosphere to exhaust trapped air.

References Cited

UNITED STATES PATENTS

| | | | |
|---|---|---|---|
| 3,174,668 | 3/1965 | Waldo ______________ | 226—97 |
| 3,318,501 | 5/1967 | Plieninger. | |

M. HENSON WOOD, Jr., Primary Examiner

RICHARD A. SCHACHER, Assistant Examiner

U.S. Cl. X.R.

226—97, 113, 146